United States Patent
Tannenbaum

(10) Patent No.: US 9,928,744 B1
(45) Date of Patent: Mar. 27, 2018

(54) SYSTEM AND METHOD OF USE FOR MANAGING SAFETY INCIDENT AND ACCIDENT FIRST RESPONSE

(71) Applicant: Adam Benjamin Tannenbaum, Ashdod (IL)

(72) Inventor: Adam Benjamin Tannenbaum, Ashdod (IL)

( * ) Notice: Subject to any disclaimer, the term of this patent is extended or adjusted under 35 U.S.C. 154(b) by 0 days.

(21) Appl. No.: 15/671,993

(22) Filed: Aug. 8, 2017

(51) Int. Cl.
| | |
|---|---|
| G08G 1/00 | (2006.01) |
| G08G 1/0967 | (2006.01) |
| H04W 4/02 | (2018.01) |
| G08G 1/09 | (2006.01) |
| H04W 4/04 | (2009.01) |
| H04W 4/12 | (2009.01) |

(52) U.S. Cl.
CPC ....... *G08G 1/096791* (2013.01); *G08G 1/091* (2013.01); *H04W 4/021* (2013.01); *H04W 4/046* (2013.01); *H04W 4/12* (2013.01)

(58) Field of Classification Search
CPC ...... B60R 21/01516; B60R 2021/0027; B60R 2021/006; B60R 21/01544
USPC ........... 340/426.18–426.34, 436, 485, 457.1, 340/901–905
See application file for complete search history.

(56) References Cited

U.S. PATENT DOCUMENTS

| | | | |
|---|---|---|---|
| 3,646,583 A | 2/1972 | Scuderi | |
| 4,371,751 A | 2/1983 | Hilligess, Jr. | |
| 5,109,399 A | 4/1992 | Thompson | |
| 5,388,147 A | 2/1995 | Grimes | |
| 5,515,043 A | 5/1996 | Berard et al. | |
| 5,515,285 A | 7/1996 | Garret, Sr. et al. | |
| 5,686,910 A | 11/1997 | Timm et al. | |
| 6,073,004 A | 6/2000 | Balachandran | |
| 6,574,484 B1 | 6/2003 | Carley | |
| 7,999,741 B2 | 8/2011 | Graves et al. | |
| 9,333,913 B1* | 5/2016 | Elders | B60Q 9/008 |
| 2004/0145459 A1* | 7/2004 | Himmelstein | G06Q 10/10 340/426.19 |
| 2009/0002145 A1* | 1/2009 | Berry | G08G 1/205 340/436 |

* cited by examiner

*Primary Examiner* — George Bugg
*Assistant Examiner* — Sharmin Akhter

(57) ABSTRACT

The invention disclosed comprises a system for managing first response to an accident, incident or event. The system uses GPS, inter-vehicle wireless communications, and cellular radio communications to direct response team vehicles to the location of an accident, incident or event; and to convey response vehicle avoidance and detouring messages to non-response vehicles and pedestrians within a geo-fence area established by the system.

3 Claims, 3 Drawing Sheets

SYSTEM AND METHOD OF USE FOR MANAGING SAFETY INCIDENT AND ACCIDENT FIRST RESPONSE

TECHNICAL FIELD

The present invention relates to managing first response to safety incident and road accidents.

BACKGROUND OF THE INVENTION

Each day in virtually every country safety incidents and road accidents occur, many involving one or more vehicles. Many such accidents are minor ones where drivers exchange information and resume their journeys. However, many others result in at least one vehicle no longer capable of being driven as well as injuries to drivers and passengers. In the latter cases, first response teams become aware of the accident because someone has reported it. Police patrol cars, ambulances, and often fire trucks race to the accident site because minutes can make a difference in life and death scenarios. Where a vehicle has rolled spilling hazardous materials on a road, first responders could include personnel and vehicles specialized to handle such materials. Where an explosion could occur, other personnel and vehicles specialized for handling such matters could be dispatched. In essence, emergency response vehicles and personnel can comprise more than patrol cars, ambulances and fire trucks.

Where accidents occur on city streets, first responders are faced with risks of other vehicles driving past the accident and pedestrians coming upon the scene and lingering. Both situations can delay life-saving action by causing delayed arrival of first-response vehicles, exiting of ambulances, and posing risks of injuries to pedestrians milling about.

Typically, when the first of the first-responder vehicles arrives, someone takes charge of directing traffic around the accident site and keeping pedestrians at safe distance from the site. Depending on other circumstances, someone else may have to communicate with yet-to-arrive first-responders to give them situational updates and directives.

A first-response management system that could begin diverting vehicles and pedestrians even before the arrival of first-response vehicles could save time and save lives.

BRIEF SUMMARY OF THE INVENTION

The invention herewith disclosed makes use of vehicular navigation technology, inter-vehicular wireless communications technology, cellular radio technology, and data processing technology in order to begin the management of an accident response prior even to the arrival of a first emergency vehicle.

In essence, the system makes use of accident/incident/event (hereinafter referred to as "accident report") report data to fix the GPS coordinates of the accident site. This GPS point becomes the center of two geo-fence areas—one for pedestrians and the other for approaching vehicles. The GPS point also serves as the location point for the systems installed in each first-response vehicle. Shortly after the accident report is received, the requisite number and types of responding vehicles are given precise directions and estimated arrival times by the system.

Essentially concurrent with the dispatch of response vehicles, the system uses the vehicular geo-fence area boundary to detect approaching vehicles and send detour directives and response-vehicle-avoidance directives (such as lane changes and/or pull off to side directives) to each vehicle's navigation system. Also concurrent with the dispatch of response vehicles, the system uses the pedestrian geo-fence area boundary to broadcast to pedestrians having mobile devices detour directives that avoid the accident site.

Where accidents occur on a highway, pedestrians are a non-issue. However, approaching vehicles because of speeds involved take on higher risk. The same system will make use of the navigation systems in proximate vehicles to issue directives to change lanes, exit before the accident site, and the like.

BRIEF DESCRIPTIONS OF THE DRAWINGS

DETAILED DESCRIPTION OF INVENTION

In general, when an accident involving vehicles occurs managing the response to the accident happens only after the arrival of the first first-response vehicle.

Where an accident occurs on streets within a town or city, the first responders, in addition to providing help to those involved in the accident must also manage traffic flow and pedestrians that happen upon the accident scene.

Managing other traffic and pedestrians may interfere with other first-response duties, causing delays in arrival of first-response vehicles and adding the risk of pedestrians being injured.

The system herein disclosed can reduce the overall response time and reduce the risks of traffic-flow management and pedestrian control.

Figure 1:
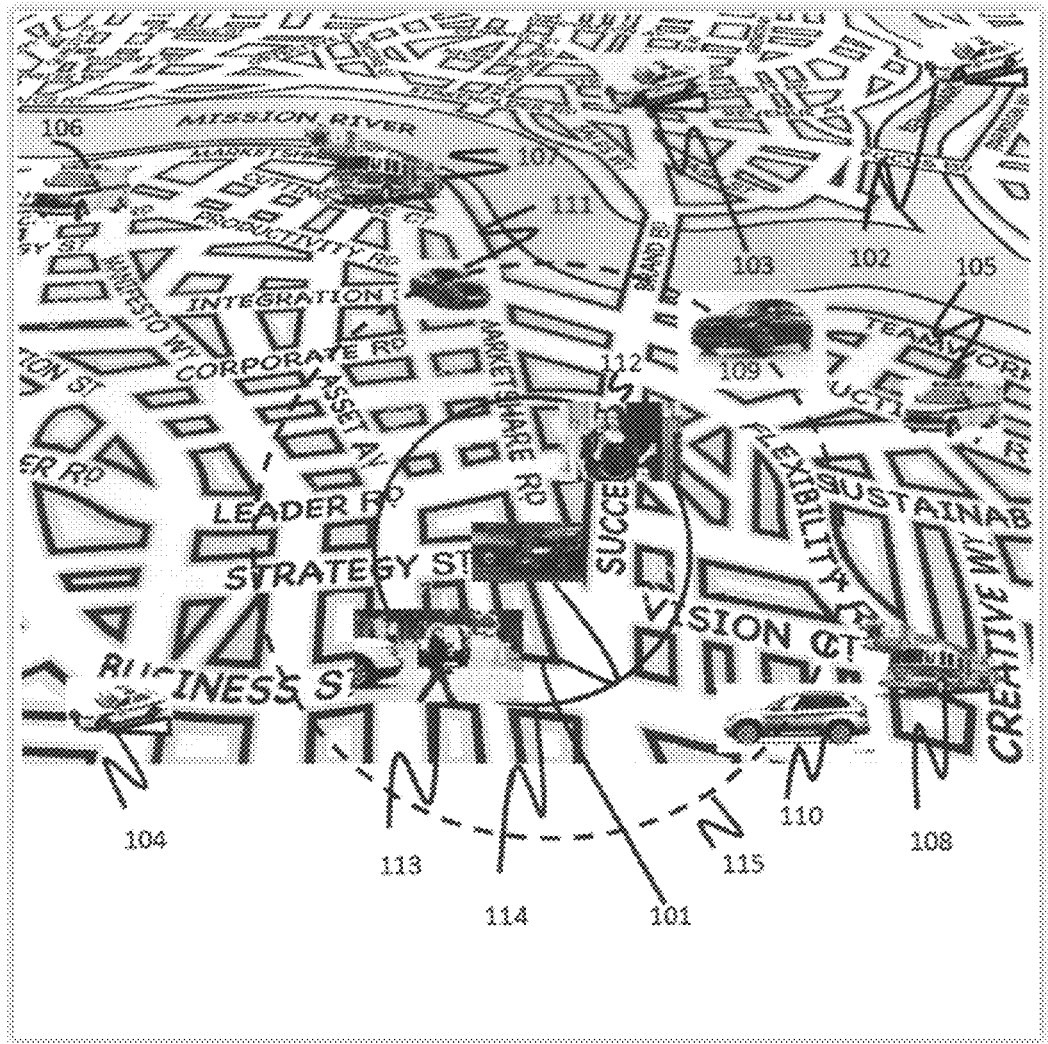
FIG. 1 depicts a vehicular accident on a town or city street and shows the relative positions of response vehicles, other vehicles and pedestrians.

FIG. 1 illustrates the problems to be dealt with after an accident on a town or city street. The exemplary accident (101) occurs at the intersection of Strategy Street and Market Share Road. At the time, potential first-response vehicles are located in various places in the town. For example, patrol car 102, is on the other side of Mission River, and assuming the north direction is up, it is located northeast of the accident site. Patrol car 103 is also on the other side of Mission River and essentially due north of the accident. And patrol car 104 is southwest of the accident site. An ambulance (105) is northeast of the accident site and a second ambulance (106) is northwest of the accident site. A firetruck (107) is northwest of the accident and a second firetruck (108) is east and slightly south. The first response issue to be dealt with is to determine which categories of response vehicles need to attend to the accident (e.g. patrol car, ambulance, fire truck, and so on), and having determined such, which of the available vehicles is going to be able to arrive the soonest. The next set of problems relate to non-emergency vehicles approaching the accident site. Vehicle 109 is approaching from the northeast, vehicle 110 is approaching from the southeast and vehicle 111 is approaching from the northwest. These vehicles, if possible, should be diverted from the accident intersection. In addition, pedestrian 112 is walking toward the accident site on Success Street and pedestrian 113 is approaching from the southwest on Business Street. To create a cordon around the accident site that enables emergency vehicles to arrive soonest and diverts both non-emergency vehicles and pedestrians away from the accident site, the system disclosed determines the accident site location and its GPS coordinates, and uses that information to establish concentric geo-fence circles (114 and 115). The smaller circle (114) is the pedestrian geo-fence area; and the larger circle (115) is the vehicular geo-fence area. The objective is to minimize convergence of pedestrians or non-emergency vehicles at the accident site.

Figure 2:
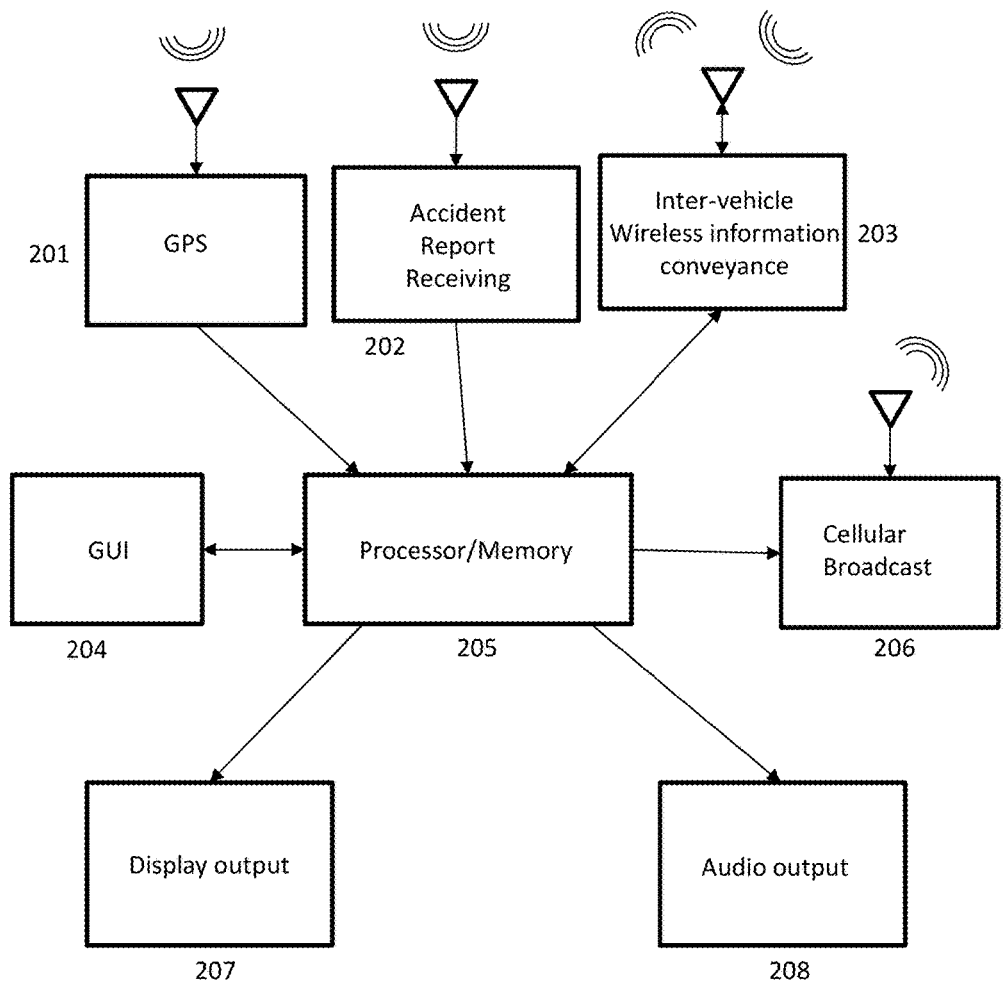
FIG. 2 is one embodiment of the system showing sub-systems and their interconnections.

FIG. 2 illustrates one embodiment of the system herein disclosed. A processor/memory subsystem (205) receives GPS location data from a GPS subsystem (201), and also receives accident report data that at least includes details about location, any injuries, and the number of injured parties. A graphical user interface (204) allows system users to input control functions to the processor/memory subsystem. A display output subsystem (207) will display text and graphics, as needed, and an audio output subsystem (208) reproduces voice data and supports interactive voice communications between the systems and their users. To further describe the subsystem functions, each vehicle in a first-response team, including patrol cars, ambulances, and fire trucks is equipped with a system. Note, the system may be dedicated to the functions described herein, or the system may be implemented in another host system comprising the same functional blocks wherein the system herein disclosed is implemented by virtue of an application running on the host system. When the accident report receiving subsystem (202) receives an accident report and its details, these are simultaneously received by all the response-team systems. Whoever responds first to the report, using the GUI subsystem, may assume incident management status. Alternatively, the system may designate an incident manager based on a vehicle's location or other criteria. Based on the accident detail data, at least one patrol car, possibly at least one ambulance, and possibly a firetruck are linked to one another via the systems. Each requisite vehicle receives accident site location coordinates from the processor/memory subsystem after being conveyed by the inter-vehicle wireless information subsystem (203). Note that the inter-vehicle wireless information system can include a two-way audio radio capability enabling vehicle personnel to communicate with one another verbally, as well. Each individual system, based on its own GPS coordinates, is then given directions and estimated arrival time data, as computed by the process/memory subsystems in that vehicle and the vehicle that is now incident manager. The process/memory subsystem in the incident manager vehicle uses the GPS coordinates of the accident site to establish the center of two concentric geo-fence areas—one for vehicles (115) and one for pedestrians (114). As vehicles approach and traverse the vehicular geo-fence boundary, each receives, via its navigation system, an alert announcement and detouring directives. As pedestrians (e.g. people walking, bicycling, skateboarding) equipped with cellular mobile devices traverse the pedestrian geo-fence boundary, they receive cellular notifications giving them detour information (e.g. the pedestrian moving east on Business Street (113) might be notified to continue on Business Street and not to turn left on Market Share Road. The pedestrian (112) moving south on Success Street may be instructed to move in the opposite direction and turn right on Flexibility Road. Similarly, the vehicles will all be given directives that detour around the intersection of Strategy Street and Market Share Road.

In another embodiment of the system, where non-emergency vehicles have autonomous driving features, the system may via an appropriate API convey control commands to the autonomous driving system that issues response-vehicle avoidance directives and detours the vehicle around the accident site. Note that such directives may be conveyed to vehicles ahead of the approaching first-response vehicles as well as those behind them.

Figure 3:
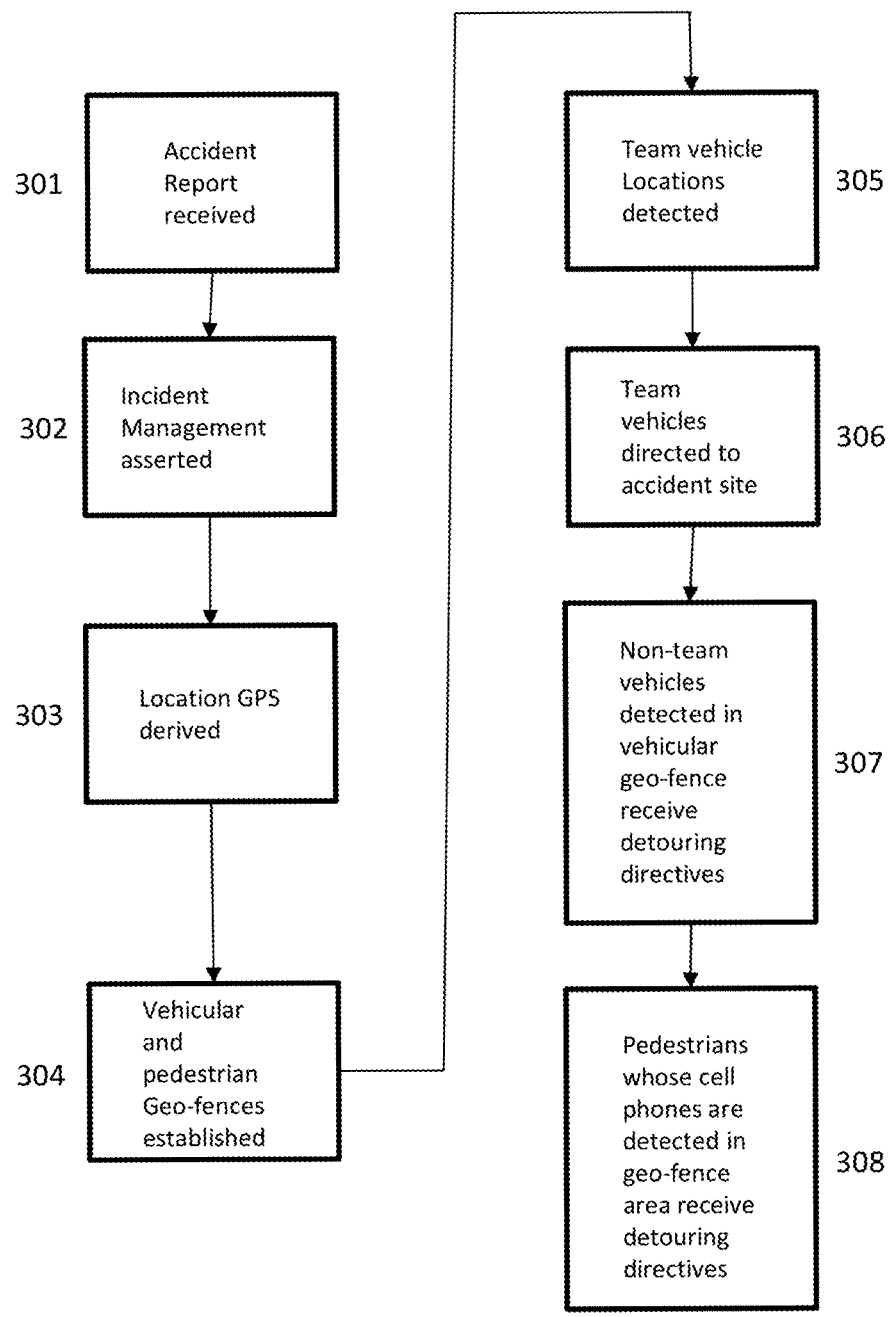
FIG. 3 is one embodiment of a use method for the system of FIG. 2.

FIG. 3 illustrates one embodiment of a system use method whereby an accident report is received (301), a first responder who responds to the report asserts incident management status (302). Based on the accident report data, the accident site location GPS coordinates are derived (303). Using that coordinate as a center point, the system establishes two concentric geo-fences (304). The system using GPS data received from the team vehicles determines each vehicle's current location (305). Based on at least one program being executed by the processor/memory subsystem of the incident management vehicle's system, team vehicles are individually directed to the accident site based on location and estimated arrival times computed. Concurrently, the system detects based on shared navigation data any non-emergency vehicles crossing the vehicular geo-fence boundary and conveys response-vehicle avoidance and detouring directives to those vehicles, such as exiting, lane-change, and similar directives. Similarly, the incident management vehicle's system detects the mobile devices of any pedestrians crossing the pedestrian geo-fence boundary. It sends a cellular-conveyed notification to those mobile devices providing an alert and detour directives.

The system herein disclosed shows individual subsystems (FIG. 2) comprising the functional infrastructure. It is understood that subsystems may be combined in integrated and/or modular components.

The embodiments disclosed are meant to be exemplary and should not be read as limiting the scope of invention.

What is claimed is:

1. A system comprising:
   - a GPS subsystem responsive to GPS satellite signals and operative to determine location coordinates based on said GPS satellite signals received and to convey said location coordinates to other subsystems;
   - an accident report receiving subsystem responsive to incoming accident reports, received wirelessly; and operative to distill location and injury data for conveyance to said other subsystems;
   - an inter-vehicle wireless information conveyance subsystem responsive to data carried by wireless communications and received from other vehicles, and operative to receive data from said other subsystems for conveyance to said other vehicles;
   - said inter-vehicle wireless information conveyance subsystem is responsive to verbal messages received and operative to enable conveyance of verbal messages in response;
   - a processor/memory subsystem responsive to data received from said other subsystems and operative to process said data and to convey said processed data to said other subsystems;
   - a graphical user interface subsystem responsive to user touch and audio inputs and operative to convey control messages based on said user touch and audio inputs to said processor/memory subsystem and to receive from said processor/memory subsystem said processed data for visual display and audio reproduction;
   - a cellular broadcast subsystem responsive to said processed data from said processor/memory subsystem and operative to convey response-vehicle avoidance and accident-site detouring messages to recipients, conveyed wirelessly via cellular telephony networks;

a display output subsystem responsive to said processed data conveyed by said processor/memory subsystem and operative to display text and graphical images;

an audio output subsystem responsive to said processed data conveyed by said processor/memory subsystem and operative to reproduce verbal messages;

said cellular broadcast subsystem operative to convey said detouring messages to said recipients only when said recipients' mobile devices' GPS subsystems indicate said recipients are within a pedestrian geo-fence area whose said boundaries are established by said processor/memory subsystem based on said location coordinates of an incident.

2. A claim as in claim 1 further comprising:

said inter-vehicle wireless information conveyance subsystem responsive only to said other vehicle's wireless signals when said other vehicles are within a vehicular geo-fence area whose boundaries are established by said processor/memory subsystem based on said location coordinates of an incident.

3. A use method comprising:

receiving incoming accident reports;

establishing an incident manager;

deriving incident's location coordinates;

establishing a vehicular geo-fence area and a pedestrian geo-fence area;

determining locations of response-team vehicles;

directing said response-team vehicles to incident's location based on said location coordinates;

detecting non-team vehicles within said vehicular geo-fence area;

conveying response-team vehicle avoidance and accident-site detouring messages to said non-team vehicles within said vehicular geo-fence area;

detecting pedestrians within said pedestrian geo-fence area;

conveying said detouring messages to said pedestrians within said pedestrian geo-fence area.

* * * * *